United States Patent Office 3,352,840
Patented Nov. 14, 1967

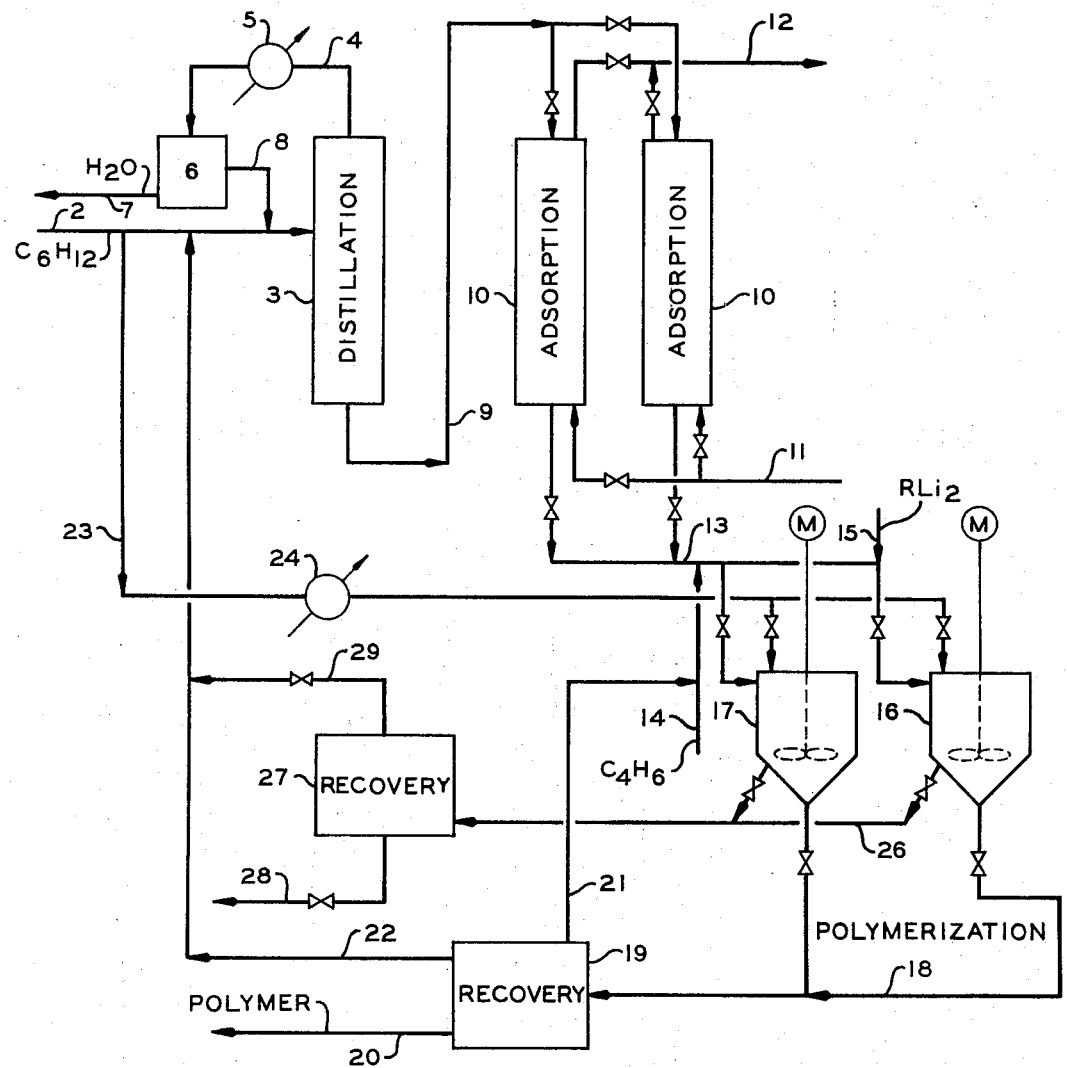

3,352,840
REMOVAL OF DEPOSITS FROM
POLYMERIZATION REACTORS
Celal M. Oktay, Bartlesville, Okla., assignor to Phillips
Petroleum Company, a corporation of Delaware
Filed June 24, 1964, Ser. No. 377,713
7 Claims. (Cl. 260—94.7)

ABSTRACT OF THE DISCLOSURE

Polymer deposits are removed from polymerization reactor walls in a system wherein conjugated alkadienes are polymerized in the presence of a lithium based catalyst, by contacting the polymer deposits with an inert hydrocarbon liquid containing catalyst poisons.

This invention relates to the polymerization of conjugated alkadienes in the presence of lithium catalysts. In one aspect the invention relates to the removal of deposits from reactors used to effect such polymerizations.

It is known in the art to convert conjugated alkadienes to cross-linkable polymers by the use of lithium catalysts. By "cross-linkable polymers," I mean polymers which are thickenable, hardenable or vulcanizable by chemical reaction. For example, this term includes polymers containing olefinic double bonds, which polymers can be vulcanized by reaction with sulfur at the double bonds. It also includes other chemical reactions between polymer molecules which reactions result in thickened or hardened polymers. For example, polymers containing functional groups such as carboxyl groups can be reacted with other polymer molecules which contain hydroxyl groups, for example, the result being an esterification which effects the cross-linking between adjacent molecules.

By "lithium catalysts," I include not only metallic lithium but also organolithium compounds wherein a lithium atom is directly bonded to a carbon atom. Examples of these compounds are n-butyllithium, n-hexyllithium, dilithio-n-butane, n-octyllithium, lithiobenzene, the dilithionaphthalenes and the dilithiobiphenyls. In general, these compounds can be represented by the formula $RLi_x$ wherein R is an organic radical selected from the group consisting of alkyl, cycloalkyl and aryl radicals havings from 3 to 20 carbon atoms per molecule and $x$ is an integer in the range 1 to 4.

It is known to convert an alkadiene such as 1,3-butadiene, in the presence of a dilithio hydrocarbon, such as dilithiostilbene, at temperatures of the order of 50° to 400° F., to a linear polymer in which each terminal carbon atom has a lithium atom bonded thereto. These polymers can be converted to the cross-linkable polymers, for example, by the reaction of the terminal lithium atoms with carbon dioxide, forming lithium carboxylate groups on the ends. The lithium carboxylate groups can be converted, by reaction with an acid, to carboxyl groups, which can then be reacted, through the normal reactions of carboxyl groups, to effect a cross-linking. Reactions of this type are described in detail in copending application Ser. No. 772,167, filed Nov. 6, 1958, now U.S. Patent 3,135,716.

It is also known in the art to convert alkadienes such as 1,3-butadiene to rubbery homopolymers, or to copolymers with copolymerizable compounds such as styrene, in the presence of organic lithium compounds such as n-butyllithium. Reactions of this type are more particularly disclosed in United States Patent 2,975,160 (1961).

I have observed that, when reactions of the type hereinbefore described are conducted, some difficulty occurs in obtaining reproducible results and, consequently, in meeting manufacturing specifications, on account of the variation in the molecular weight (evidenced by viscosity) of the product polymer. It is desirable to be able to achieve the greatest possible reproducibility in reactions of this type whether conducted batchwise or continuously. I have further noticed that reactions of the type described are accompanied by the formation of gel or insoluble polymer which deposits on reactor walls and agitator surfaces in a reaction zone. These deposits appear to be high molecular weight polymers in which lithium atoms are directly bonded to carbon atoms. These polymers, if allowed to remain in the reactor, continue to function as active polymerization promoters and cause erratic increases in the effective molecular weight of the polymer produced. I have found that it is desirable to remove these deposits at regular intervals.

An object of this invention is to improve reproducibility in the production of cross-linkable polymers by the use of lithium catalysts. Another object is to remove reactor deposits which accompany the formation of polymers catalyzed by lithium catalysts. Other objects and advantages will become apparent to those skilled in the art upon consideration of this disclosure.

The accompanying drawing is a diagrammatic flow sheet illustrating one specific embodiment of this invention.

Reactions of the type hereinbefore described are frequently carried out in the presence of a hydrocarbon diluent which is liquid and inert under the polymerization conditions. Such a diluent is generally selected from the group consisting of paraffinic, cycloparaffinic and aromatic hydrocarbons. Specific examples are the isohexanes, n-hexane, the isooctanes, cyclohexane, methylcyclopentane, benzene, toluene, and the xylenes. These hydrocarbons are frequently obtained from petroleum or coal tar refining processes and contain small but effective amounts of impurities which act as poisons for lithium catalysts. While the nature of these impurities is not completely understood, they appear to include such compounds as water, organic oxygen compounds such as alcohols, peroxides, ethers, heterocyclic oxygen compounds and naphthenic acids as well as organic sulfur compounds such as the mercaptans and thioethers. Consequently, these impurities are customarily removed from the diluent prior to its use in the polymerization process.

According to my invention, the reactor deposits previously referred to can be removed from reactor surfaces by treatment with a diluent containing at least some of the impurities previously referred to, i.e., without purification. While the conditions under which this treatment can be carried out can be selected over a very wide range, I have found that a temperature in the range 100 to 300° F. gives satisfactory results. It is also desirable to provide agitation for the diluent in removing the reactor deposits and it is generally desirable to spray the diluent against the surfaces on which the deposits occur. Any suitable apparatus which effects this type of operation can be used. The deposit removal can also be aided by scraping and the like if desired. Generally a time in the range 1 to 30 minutes is suitable for removal of reactor deposits although times outside this range can be used.

The periodic removal of the described deposits from polymerization reactors in accordance with my invention, results in improved reproducibility and decreased variations in the properties of polymers produced over a given period of time.

The frequency of treatment of reactor surfaces for polymer removal varies appreciably depending upon the specific reaction being carried out and the specific conditions. Generally, the reactor should be treated for removal of deposit after from 5 to 100 hours of use. The optimum schedule of deposit removal can readily be determined by mere routine test in any specific set of circumstances.

A specific embodiment of my invention is here described in connection with the drawing. This specific embodiment involves the conversion of 1,3-butadiene to a highly viscous polymer containing approximately two lithium atoms per molecule. While the invention is not limited to any specific reaction mechanism it appears that the polymer deposited on reactor interior surfaces is essentially linear with one lithium atom attached to each terminal carbon atom. A specific lithium compound used is a dilithio methylnaphthalene. The diluent used to effect this reaction is cyclohexane. The dilithio polymer thus produced can be reacted with carbon dioxide to substitute lithium carboxylate groups for the terminal lithium atoms. The lithium carboxylate groups can be converted to carboxyl groups by reaction with hydrochloric acid. The carboxylated polymers can then be placed in a suitable mold and reacted with a suitable hydroxy compound for cross-linking esterification and hardening.

In the system shown in the drawing, cyclohexane containing impurities enters the system through inlet 2. Although not shown in the drawing, it is frequently desirable to pass the cyclohexane into a settling zone for the removal of any undissolved separate phase of water or other impurity. The substantially homogeneous cyclohexane is passed to distillation zone 3, which can include an ordinary fractional distillation column. Dissolved water is removed overhead as a heterogeneous azeotrope through conduit 5, is condensed in condenser 5 and passed into accumulator 6, where a water phase separates from a hydrocarbon phase. The water phase is withdrawn through conduit 4, is condensed in condenser 5 and is returned as reflux through conduit 8.

The kettle product of the distillation is dried cyclohexane having a water content from about 1 to about 10 parts per million, by weight. Distillation zone 3 can be operated at an overhead temperature of 200° F., a kettle temperature of 215° F. and a pressure of 22 p.s.i.a.

The dried cyclohexane is passed through conduit 9 to adsorption zone 10, which is here shown in the form of a dual unit so that one bed of adsorbent can be regenerated while the other is in use. Suitable adsorbents include alumina, silica, various aluminosilicates and zeolites, activated charcoal and the like. These materials and their use are well known in the art. In this specific embodiment calcined bauxite is used. Adsorption zone 10, during the adsorption cycle, is maintained at a temperature of 100° F. and a pressure of 100 p.s.i.a. After the effectiveness has decreased somewhat, a regeneration gas can be supplied through manifold conduit 11 and removed through conduit 12, the other adsorption unit 10 then being used for adsorption.

The purified cyclohexane is withdrawn from adsorption zone 10 through conduit 13. Butadiene is added through inlet 14 and the dilithiomethyl naphthalene catalyst through inlet 15. This mixture is passed directly into reactor 16 which can be an autoclave provided with a stirrer. The polymerization is conducted in reactor 16 and the effluent thereof passes through conduit 18 to recovery zone 19, which can be conventional equipment for recovering polymers from solution. Product polymer is withdrawn through outlet 20. Any unreacted butadiene is recycled through conduit 21. Depending upon the recovery method employed and the concentrations of catalyst inactivating components in this recycle monomer and in the fresh monomer stream 14, poisons-removing treatments of the nature of distillation step 3 and adsorption step 10 may be employed. Recovered cyclohexane is recycled through conduit 22. If the solvent recovery step in zone 19 is a nonaqueous treatment, this recovered cyclohexane may be recycled to stream 9 or stream 13 depending upon its content of catalyst-inactivating components.

After approximately 30 hours of use, reactor 16 is shut down and reactor 17 substituted therefor by conventional manifolding means. Unpurified cyclohexane is then diverted from inlet 2 through conduit 23, heated to 150° F. in heater 24 and passed into reactor 16 wherein it is sprayed, by means not shown, directly against the reactor surfaces. A contact time of approximately 30 minutes inside reactor 16 is used. The resulting mixture of cyclohexane and polymer is passed through conduit 26 through recovery (e.g., flash) zone 27 wherein the cyclohexane is vaporized. The residual polymer is withdrawn through outlet 28 and used as may be desired or discarded. Vaporized cyclohexane is condensed in means not shown and recycled through conduits 29 and 22 to purification steps 3 and 10 for removal of catalyst inactivating materials remaining from the polymer inactivation treatment.

In another specific embodiment of the invention, wherein 1,3-butadiene is converted to vulcanizable rubbery polymer in the presence of n-butyllithium, n-hexane is used as the diluent. The operation is as hereinbefore described in connection with cyclohexane except that distillation zone 3 is operated at an overhead temperature of 176° F., a kettle temperature of 179° F. and a pressure of 20 p.s.i.a. Alumina treater 10 is operated at a temperature of 120° F. and a pressure of 56 p.s.i.a.

In both specific embodiments, variations in polymer properties are more readily minimized than when the deposit removal procedure of this invention is not utilized.

I claim:

1. In a process wherein a conjugated alkadiene is converted to a cross-linkable polymer in the presence of a lithium catalyst and polymer deposits having lithium atoms directly bonded to carbon atoms accumulate on reaction zone surfaces concomitantly with the conversion, the improvement which comprises removing said deposits from said surfaces by contacting with an inert liquid hydrocarbon containing impurities selected from the group consisting of water, organic sulfur compounds, organic nitrogen compounds and organic oxygen compounds, said impurities being present in amounts sufficient to inactivate said polymer deposits.

2. In a process wherein a conjugated alkadiene having from 4 to 6 carbon atoms per molecule is converted to cross-linkable polymer in the presence of an organolithium catalyst and an inert liquid hydrocarbon diluent which is purified for removal of catalyst poisons prior to use in the conversion, polymer deposits having lithium atoms directly bonded to carbon atoms being formed on conversion zone surfaces during said conversion, the improvement which comprises removing said deposits from said surfaces by contacting with said diluent prior to said purification, said diluent prior to said purification having impurities present in amounts sufficient to inactivate said polymer deposits.

3. In a process wherein a conjugated alkadiene having from 4 to 6 carbon atoms per molecule is converted to cross-linkable polymer in the presence of a liquid hydrocarbon diluent and an organolithium catalyst, said diluent being purified, before use in the conversion, for removal of impurities by vaporization of at least part of said impurities and subsequently contacting said diluent with an adsorbent, the improvement which comprises discontinuing said conversion and removing polymer deposits having lithium atoms directly bonded to carbon atoms by passing said diluent, without said removal of impurities, into the conversion zone, said diluent used for removing said polymer deposits having sufficient impurities to inactivate said polymer deposits.

4. A process according to claim 3 wherein said diluent is supplied into said conversion zone at a temperature in the range 100 to 300° F.

5. A process according to claim 4 wherein the organolithium catalyst is a dilithio methylnaphthalene, the alkadiene is 1,3-butadiene, and the diluent is cyclohexane.

6. A process according to claim 4 wherein the organolithium catalyst is a dilithiomethyl naphthalene, the alkadiene is 1,3-butadiene, and the diluent is toluene.

7. A process according to claim 4 wherein the organolithium catalyst is n-butyllithium, the alkadiene is 1,3-butadiene and the diluent is n-hexane.

References Cited

UNITED STATES PATENTS

| | | | |
|---|---|---|---|
| 2,801,234 | 7/1957 | Hanson | 260—94.7 |
| 2,856,391 | 10/1958 | Diem | 260—94.2 |
| 3,208,988 | 9/1965 | Forman et al. | 260—94.2 |
| 3,278,508 | 10/1966 | Kahle et al. | 260—94.3 |

FOREIGN PATENTS 665,771  6/1963  Canada.

JOSEPH L. SCHOFER, *Primary Examiner.*

H. I. CANTOR, W. F. HAMROCK, *Assistant Examiners.*